US 6,661,961 B1

(12) United States Patent
Allen et al.

(10) Patent No.: US 6,661,961 B1
(45) Date of Patent: Dec. 9, 2003

(54) FIBER LOW PROFILE NETWORK INTERFACE DEVICE

(75) Inventors: Barry W. Allen, Siler City, NC (US); Sam Denovich, Harrisburg, PA (US); Robert E. Dorian, Turnersville, NJ (US)

(73) Assignee: Tyco Electronics Corporation, Middletown, PA (US)

( * ) Notice: Subject to any disclaimer, the term of this patent is extended or adjusted under 35 U.S.C. 154(b) by 139 days.

(21) Appl. No.: 09/704,098

(22) Filed: Nov. 1, 2000

(51) Int. Cl.[7] .............................................. G02B 6/00
(52) U.S. Cl. ...................................... 385/135; 385/147
(58) Field of Search ............................... 385/134–138, 385/147

(56) References Cited

U.S. PATENT DOCUMENTS

| | | | | |
|---|---|---|---|---|
| 4,595,255 A | * | 6/1986 | Bhatt et al. .................. | 385/135 |
| 4,824,196 A | * | 4/1989 | Bylander ..................... | 385/135 |
| 4,949,376 A | * | 8/1990 | Nieves et al. ............... | 379/399 |
| 5,367,598 A | * | 11/1994 | Devenish, III et al. ...... | 385/135 |
| 5,668,911 A | * | 9/1997 | Debortoli .................... | 385/135 |
| 5,790,741 A | * | 8/1998 | Vincent et al. .............. | 385/135 |
| 5,802,237 A | * | 9/1998 | Pulido ......................... | 385/135 |
| 6,193,420 B1 | * | 2/2001 | Sikorski, Jr. ............. | 385/134 X |
| 6,385,381 B1 | * | 5/2002 | Janus et al. ................. | 385/135 |
| 6,389,212 B1 | * | 5/2002 | Yamagata ................... | 385/135 |

* cited by examiner

Primary Examiner—Lynn Feild
Assistant Examiner—Son V. Nguyen
(74) Attorney, Agent, or Firm—Baker & Daniels

(57) ABSTRACT

A low profile fiber network interface device is disclosed including a housing enclosure having a front cover hinged to a rear fixed housing portion. An inner connection divider wall is also hingedly fixed to the enclosure which is rotatable between a position which the divider wall lies against the fixed housing portion, and to an open position where it lies adjacent to the open cover. The divider wall also includes a rotatable working tray which rotates to a substantial horizontal position, and the tray includes devices for retaining coiled fiber in position. The divider wall also includes an interface wall including a plurality of fiber optic connector headers whereby one side is accessible only from the back side of the divider wall, whereas the other header is accessible from the front of the divider wall. In this manner, when the divider wall is locked in the closed position, users cannot access the opposite side which is dedicated to the telecom service.

38 Claims, 8 Drawing Sheets

FIBER LOW PROFILE NETWORK INTERFACE DEVICE

BACKGROUND OF THE INVENTION

1. Field of the Invention

The invention relates to a network interface device usable with a fiber optic network.

2. Description of the Prior Art

It is relatively common in the electronics industry, to transfer signals by way of an optical fiber due to a number of advantages that light transmission has over transmission of electrical signals, namely the very high transmission rate of signals and the insensitivity of light signals to electrical and magnetic fields. One common example of high-speed data transmission is in the field of telecommunications.

In this regard, it is common to provide a junction box for the connection of service. Such a junction box is commonly known as a Network Interface Device, and has an area restricted to the service company which can be locked off, and an area which is accessible to the user. In the case of fiber, there is no adequate Network Interface Device which provides proper cable management while at the same time providing for a relatively small volume enclosure. This is mainly due to the fact that the fiber cable cannot be severely twisted, or coiled tightly into small radii, otherwise it loses its optical transmission characteristics.

SUMMARY OF THE INVENTION

The above-mentioned shortcomings in the prior art have been rectified by this invention which provides a fiber optic interconnection enclosure, comprising a housing enclosure, and a fiber optic interconnection divider wall. The divider wall divides the housing enclosure into a telecom interconnection area and a system interconnection area, the interconnection divider wall having a connection interface to provide the interface between the telecom interconnection area and the system interconnection area.

In the preferred embodiment of the invention, the fiber optic interconnection divider wall is pivotal about a hinge in said housing enclosure. The housing enclosure is comprised of a first, housing portion having a back wall, and a second housing portion hinged to the first housing portion and movable relative thereto about the hinge. The fiber optic interconnection divider wall is also hinged relative to the first and second housing portions and rotatable relative thereto. Preferably, the first and second housing portions all rotate about the same pivot axis.

In the preferred version, the fiber optic interconnection divider wall includes an interface wall extending transversely of the pivot axis. The interface wall extends in a horizontal plane, and the connection interface comprises a fiber optic header. Preferably, the mating axis for the header is vertical.

In the preferred version, the fiber optic interconnection divider wall includes a rotatable work tray on the back side thereof, which pivots about a horizontal axis, whereby the fiber optic interconnection divider wall can be rotated to its fully open position, and the work tray rotated downwardly to a position adjacent to horizontal. Preferably, the work tray includes a fiber cable splice holder. Also preferably, the work tray includes a retaining area for holding coiled fiber cable.

In another embodiment of the invention, a fiber optic interconnection enclosure comprises a housing enclosure, a fiber optic interconnection divider wall dividing the housing enclosure into a telecom interconnection area and a system interconnection area. The fiber optic interconnection divider wall includes a rotatable work tray, which pivots about a horizontal axis, whereby the rotatable work tray can be rotated downwardly to a position adjacent to horizontal.

Preferably, the fiber optic interconnection divider wall is pivotal about a hinge in the housing enclosure. The housing enclosure is comprised of a first housing portion having a back wall, and a second housing portion hinged to the first housing portion and movable relative thereto about the hinge. The fiber optic interconnection divider wall is also hinged relative to the first and second housing portions and rotatable relative thereto. The fiber optic interconnection divider wall, and first and second housing portions, all rotate about the same pivot axis. The fiber optic interconnection divider wall includes an interface wall extending transversely of said pivot axis.

Also preferably, the fiber optic interconnection divider wall has a connection interface to provide the interface between the telecom interconnection area and the system interconnection area. The fiber optic interconnection divider wall extends in a horizontal plane, and said connection interface comprises a fiber optic header having header halves on opposite sides of the plane. The mating axis for the header is vertical. The rotatable work tray is positioned on the back side of the fiber optic interconnection divider wall and pivots about a horizontal axis, whereby the fiber optic interconnection divider wall can be rotated to its fully open position, and the work tray rotated downwardly to a position adjacent to horizontal. The work tray preferably includes a fiber cable splice holder. The work tray includes a retaining area for holding coiled fiber cable.

In yet another embodiment of the invention, a fiber optic interconnection enclosure comprises a housing enclosure, a connection interface defining an interface between a telecom interconnection and a system interconnection, and a rotatable work tray that pivots about a horizontal axis. The rotatable work tray can be rotated downwardly to a position adjacent to horizontal.

In the preferred version, the fiber optic interconnection enclosure further comprises a fiber optic fiber optic interconnection divider wall dividing the housing enclosure into a telecom interconnection area and a system interconnection area. Preferably, the rotatable work tray is positioned on a back side of the fiber optic interconnection divider wall and pivots about a horizontal axis, whereby the fiber optic interconnection divider wall can be rotated to its fully open position, and the work tray rotated downwardly to a position adjacent to horizontal. The fiber optic interconnection divider wall has a connection interface to provide the interface between the telecom interconnection area and the system interconnection area. The fiber optic interconnection divider wall includes an interface wall which extends in a horizontal plane, and the connection member comprises a fiber optic header having header halves mounted to the interface wall.

Preferably, the work tray includes a fiber cable splice holder. The work tray includes a retaining area for holding coiled fiber cable.

The preferred embodiment of the invention will now be described by way of reference to the following drawings.

DETAILED DESCRIPTION OF THE PREFERRED EMBODIMENT

Figure 1:
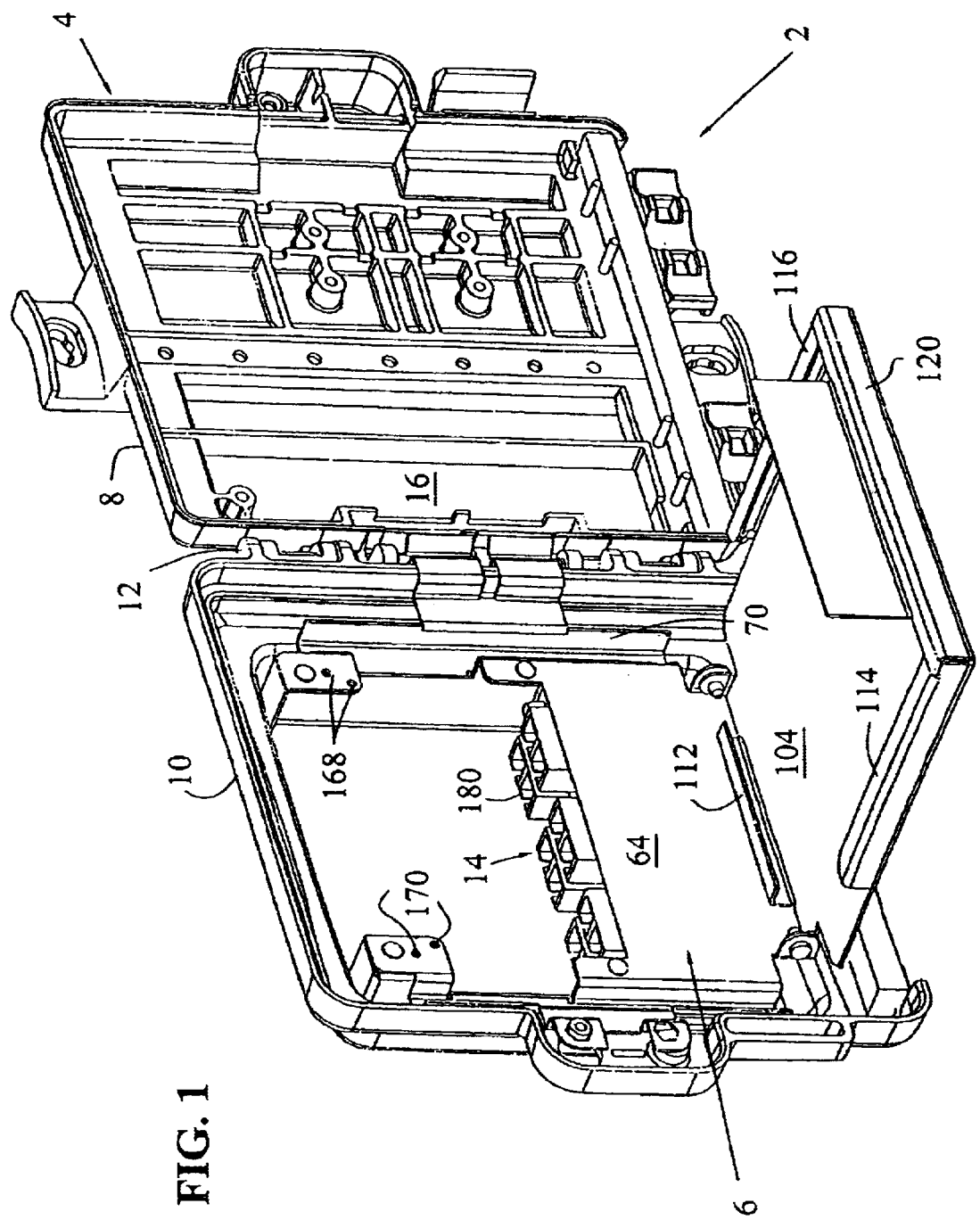
FIG. 1 is an isometric view of the Network Interface Device in the fully open position.

With reference first to FIG. 1, a fiber optic interconnection enclosure is shown generally at 2 which generally includes an enclosure or housing member 4 and a fiber optic interconnection divider wall shown generally at 6. The enclosure 4 includes a fixed housing portion 8 and a rotatable housing portion 10 that pivots generally about a hinge member 12 of the enclosure 4. Finally, as shown in FIG. 1, a connection interface is shown generally as 14 which forms an interface between the telecom side and the user or system side as will be described herein.

Figure 2:
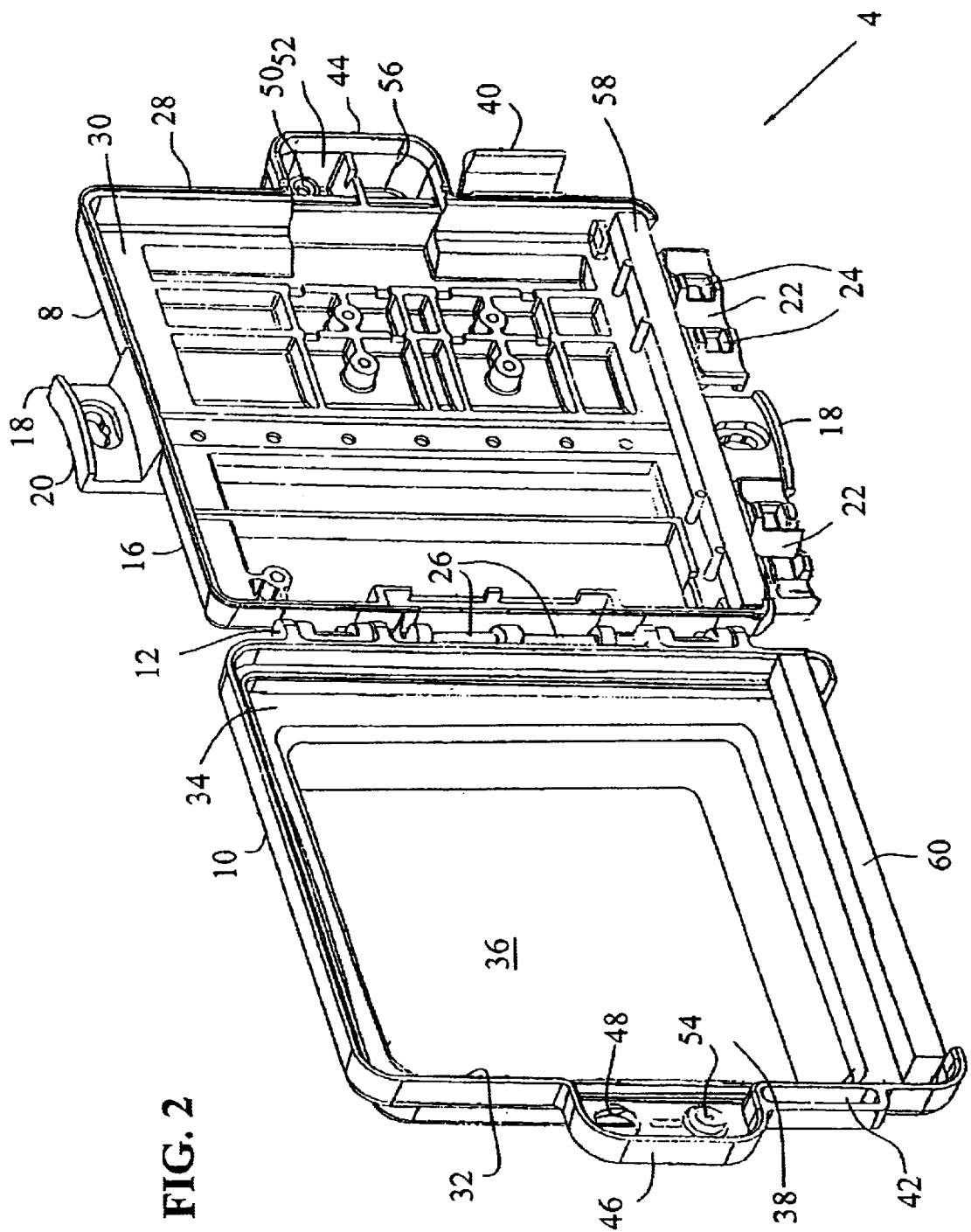
FIG. 2 is a view similar to that of FIG. 1 showing the fiber optic interface wall removed.

With respect first to FIG. 2, the housing enclosure 4 is shown in the open position, without the divider wall 6. The enclosure portion 8 is comprised of a back wall 16 which can be mounted flush to another surface, and includes mounting ears 18 having radiused surface 20 allowing the enclosure 4 to be alternatively mounted to a curved surface, such as a pole. The housing portion 8 further includes along a lower edge thereof, arcuately shaped cable receiving grooves 22 spanned by openings such as 24, for receiving a cable tie for strain relief purposes. The housing portion 8 further includes two cylindrical hinge sections 26, which lie in the same axis as hinge member 12. The housing portion 8 further includes a perimetral wall at 28, which defines a recessed portion at 30, as will be described in greater detail herein.

As also shown in FIG. 2, housing portion 10 includes a perimetral wall at 32 defining a recessed surface at 34, and a further inner recessed surface at 36 defining an inner cavity at 38. The housing members 8 and 10 are latched together by way of cooperating latches 40 and 42. Housing portions 8 and 10 also include locking members 44 and 46, with an opening 48 aligned with threaded post 50 within compartment 52, and opening 54 aligned with compartment 56. Finally, sponge seal members 58 and 60 are disposed at the lower edges of the housing members 8, 10, respectively.

Figure 3:
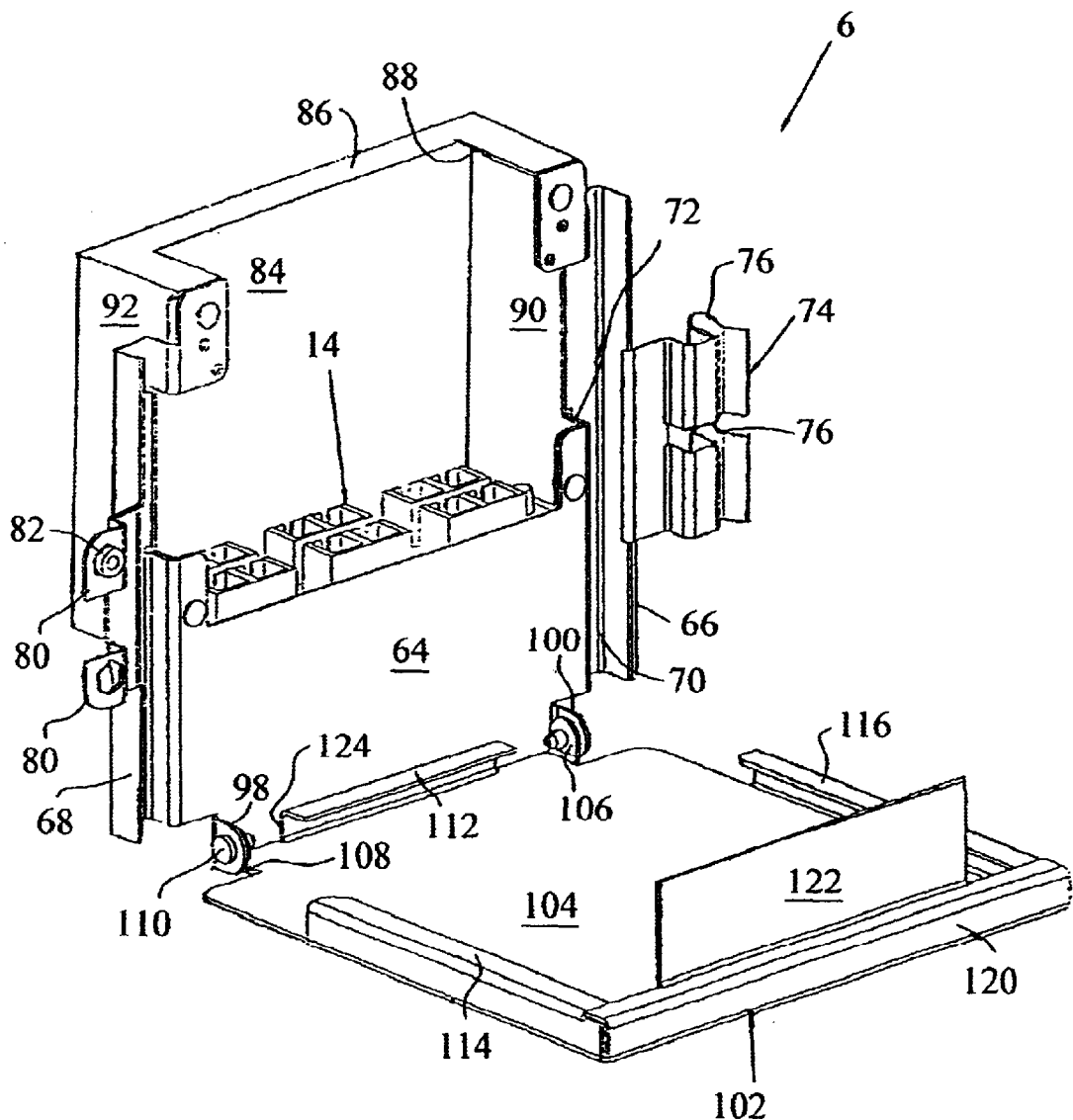
FIG. 3 is an isometric view of the fiber optic interface wall.

With respect now to FIG. 3, divider wall 6 is shown in greater detail. As shown in FIG. 3, the fiber optic interconnection divider wall 6 includes a wall section 64 having a first side edge section 66 and a second side edge section 68 extending from the opposite side. The section 66 includes a cable-receiving channel at 70 which communicates with an opening at 72. Extending from the channel section 70 is a hinge member 74 including two snap latches shown generally at 76. Side edge section 68 includes ears 80 extending therefrom, each of which have threaded lugs shown generally at 82. The fiber optic interconnection divider wall 6 is further comprised of a back wall section 84 having a top surface 86 having a cut-out at 88, and side walls 90 and 92.

With reference still to FIG. 3, wall 64 includes mounting ears 98, 100 which cooperate as trunnions for rotatable tray 102. Tray 102 is comprised of a wall section 104 having mounting tabs 106, 108 which cooperate with ears 100, 98, respectively, via rivets 110. Tray 102 further includes inwardly curved wall sections 112, 114, 116, and 120, where flap portion 122 extends forwardly from wall 120 to cooperate within the opening 88 as described herein. In the preferred embodiment of the invention, the rotatable tray 102 has three positions. The first position is a fully closed position where the tray 102 is rotated upwardly, such that wall 104 lies adjacent to wall 64, The second position is shown in FIG. 3, where the wall is held in a substantially horizontal position. The third position is such that the wall 102 is rotated fully downwardly such that walls 64, 104 would be co-planar. This positioning could be accommodated in a number of ways, as appreciated by one of ordinary skill in the art. For example, the wall portion 112 could have a rear wall portion 124 which abuts wall 124, such that the tray 102 is held in the position of FIG. 3, yet still be rotated downwardly. Alternatively, the rivets or the associated members 98, 100, 106, 108 could be slotted so as to hold the tray 102 in a plurality of positions. Finally, a separate spring detent could be positioned between the walls 64, 104 which would allow for various positions. Finally, with respect to FIG. 6, interconnection interface 14 is mounted to wall 130 which in turn is removably mounted to divider wall 6 by way of pin rivets 132.

Figure 4:
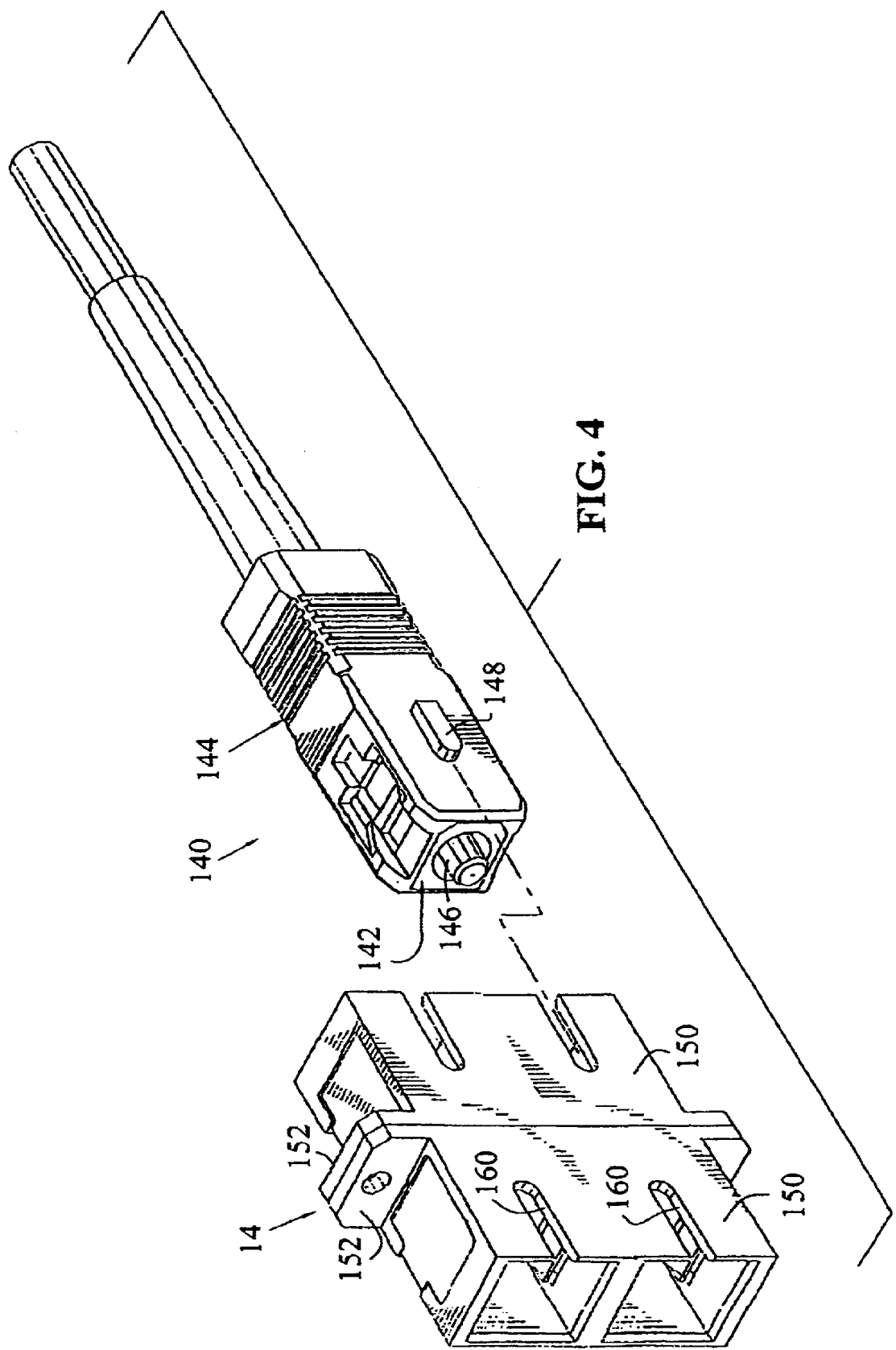
FIG. 4 is an isometric view of the plug and jack assembly used in the FIG. 1, Network Interface Device.

With reference now to FIG. 4, a fiber optic plug assembly is shown generally at 140 which is insertable and latchably connected to the fiber optic connection interface 14. This known fiber optic connector plug 140 is comprised of an inner plug body shown generally as 142 and an outer plug housing 144. The plug assembly includes an inner ceramic ferrule 146, which carries the fiber, and a polarizing lug 148 for alignment with the interface 14. This connector assembly is available from the AMP Division of Tyco Electronics, and is known as the SC Series Fiber connector. This connector is also more fully described in U.S. Pat. No. 5,542,015, incorporated herein by reference.

Figure 5:
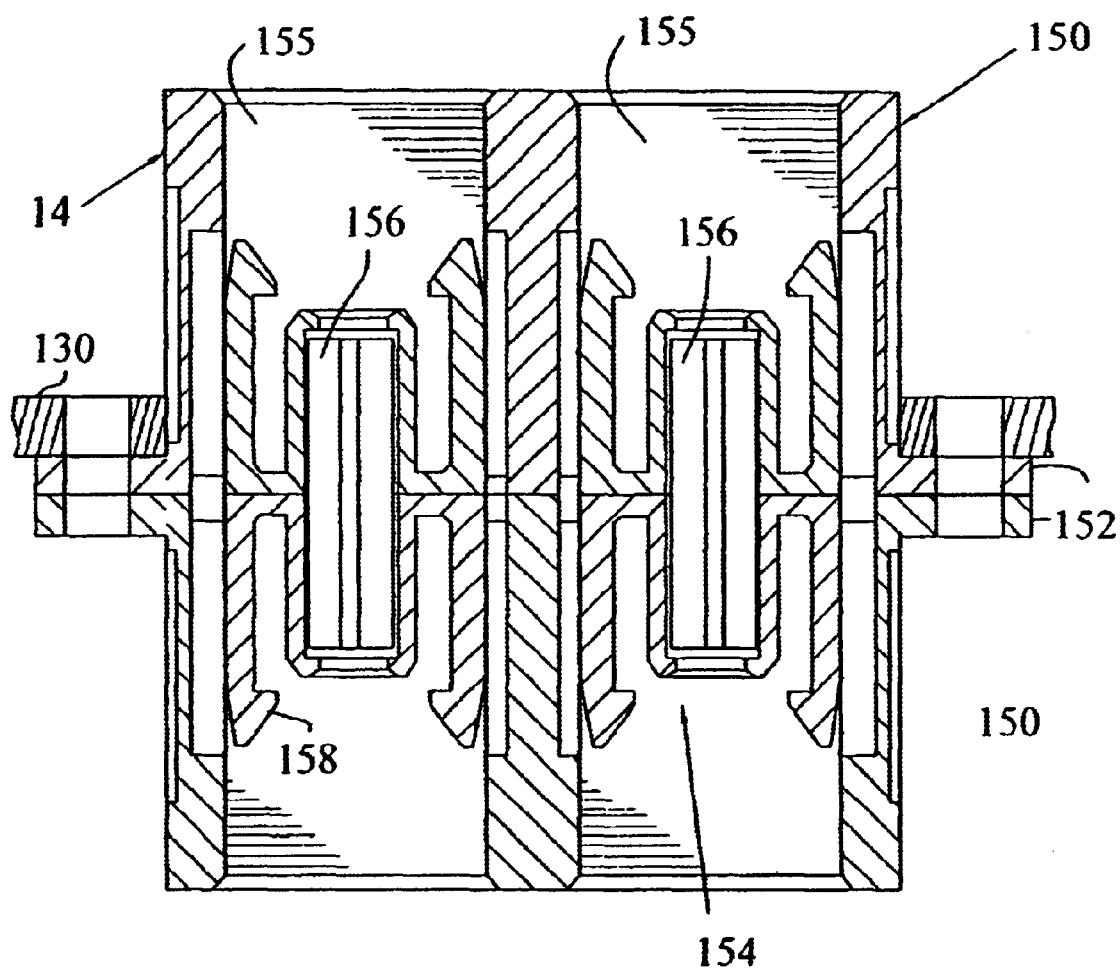
FIG. 5 shows a cross sectional view through the axial centerline of the receptacle assembly of FIG. 4.

With reference now to FIGS. 4 and 5, the connection interface 14 will be described in greater detail. The connection interface 14 is comprised of two identical halves 150 having flanges 152 which can be butted one to the other and fixed in place by such means as adhesive or ultrasonic welding. The connection interface 14 further includes two identical latch members 154 in each fiber connector port 155 which receive between them a fiber aligning ferrule 156. The latch members 154 further include latch projections 158, which retain the fiber plug assembly as is known in the art The connection interface 14 is held to the wall 130 by way of the rivets 132 as previously described. Finally, the identical halves 150 include polarizing slots 160 for receiving the polarizing lug 148 on the plug assembly 140.

With reference now to FIGS. 2 and 3, the assembly of the device will be described. With reference first to FIG. 3, it should be appreciated that the divider wall 6 is insertable into the housing enclosure 4, by rotating the tray 102 upwardly to a position where flap member 122 is within the recess 88. The divider wall 6 can then be snapped in place by way of the individual latch members 76 being snapped in place against the cylindrical pins 26. This places the tray wall 104 adjacent to the back wall 16 of housing portion 8. Once snapped in place, the divider wall 6 can be rotated between the positions shown in FIGS. 1 and 6. It should also be appreciated that the divider wall 6 is also removable, for assembly purposes, as will be described herein.

Figure 7:
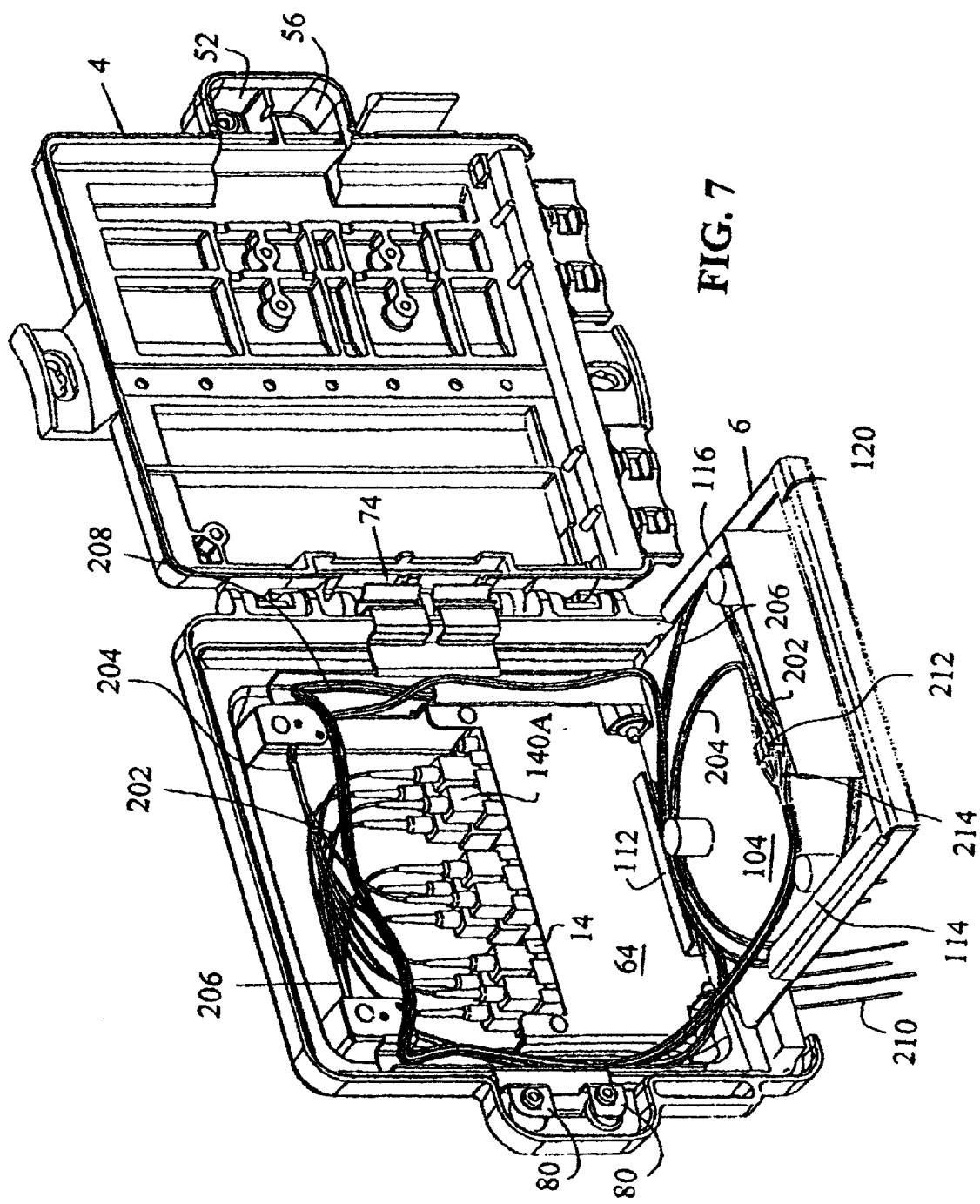
FIG. 7 is an isometric view showing the Network Interface Device in the assembled position with the fiber cables terminated.

With reference to FIG. 7, the fiber connections can be made as follows. First, an incoming fiber cable to be terminated is measured, by positioning the cable adjacent to the housing enclosure 4, and then cutting the cable, leaving adequate length for the splice termination. At this point, the fiber optic interconnection divider wall 6 can be removed from the housing enclosure 4, by unsnapping the hinges 74, and taking the divider wall 6 to a splicing bench. The divider wall has two detented positions as described above, one which is approximately at a 90 degree angle, and one where the divider wall lay almost flat, that is at a 180 degree angle. The flat position allows for easy installation of the cable.

The fiber connectors 140 are also plugged into respective receptacles 14, with the connectors 140A having individual fiber cables such as 202 being accumulated within jacketed cables 204 and 206. Meanwhile, pigtail 208 is positioned adjacent to the divider wall 6, and cable tied thereto as described above. The individual cables 214 of the pigtail 208 and 202 of cables 204, 206 are positioned adjacent to each other, and are then spliced together, as is well known in the art. After splicing, the spliced cables are positioned in the splice holder 212, as shown in FIG. 7. It should be appreciated that after the splicing is completed, the divider wall and cables are returned to the housing enclosure 4 and snapped back in place.

Figure 8:
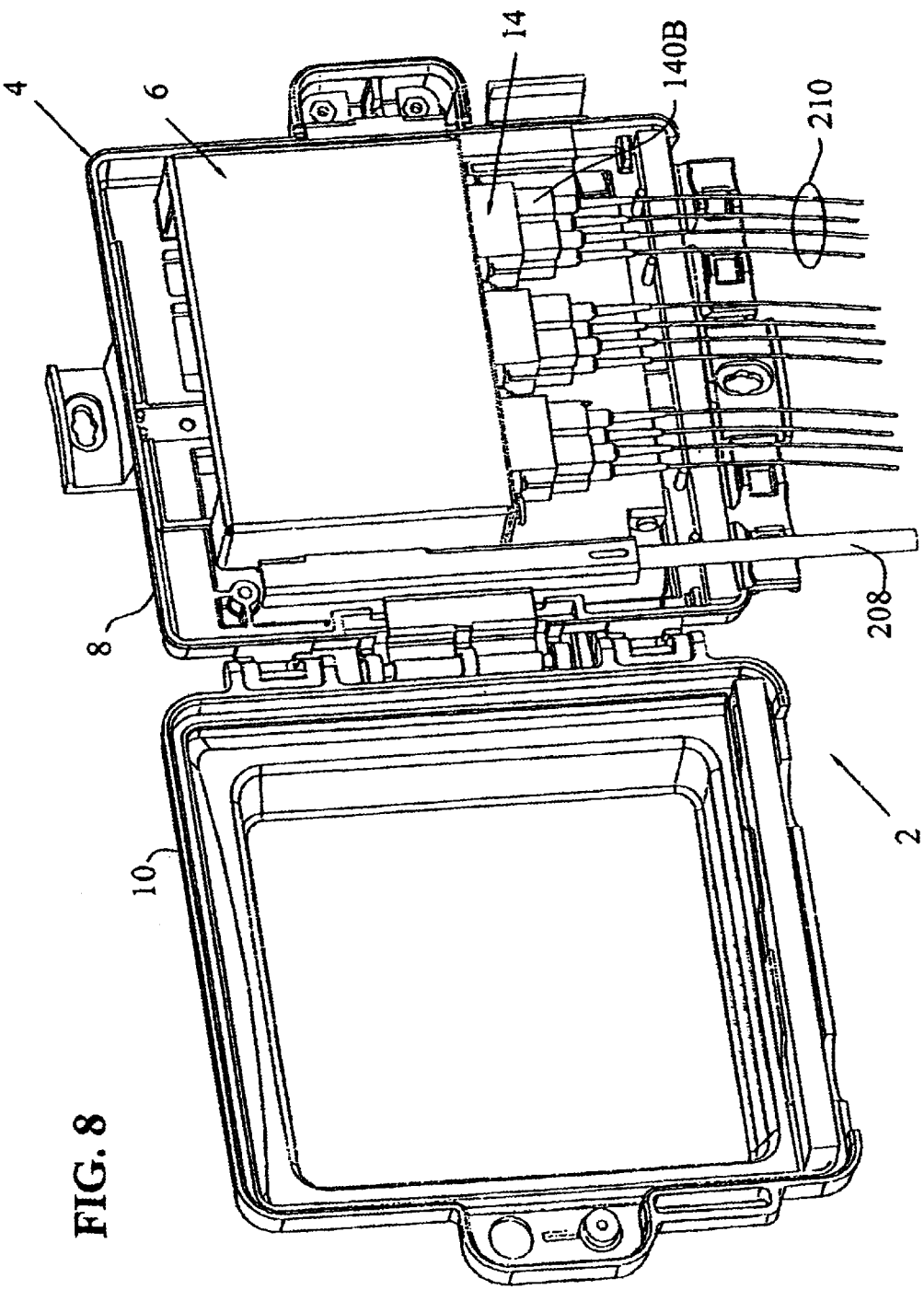
FIG. 8 is an isometric view similar to that of FIG. 6, showing the Network Interface Device in the assembled position.

As shown in FIG. 7, the cables are positioned within the housing enclosure such that the cables are coiled adjacent to wall 64 and then can turn to lie parallel and adjacent to wall 104. The cables 204, 206 are positioned adjacent to wall 104, such that the cable is coiled between the sections 112, 114, 116, and 118. In other words, the fiber coil is beneath each of the sections 112, 114, 116 and 120. The tray 102 is now rotated upwardly to its fully closed position, and then the entire divider wall 6 is rotated to the fully closed position, such that the ears 80 lie adjacent to the corresponding portions 52, 56. Individual plug connectors 140B, viewed in FIG. 8, attached to cables 210, are pluggably connected to the connection interface 14.

Figure 6:
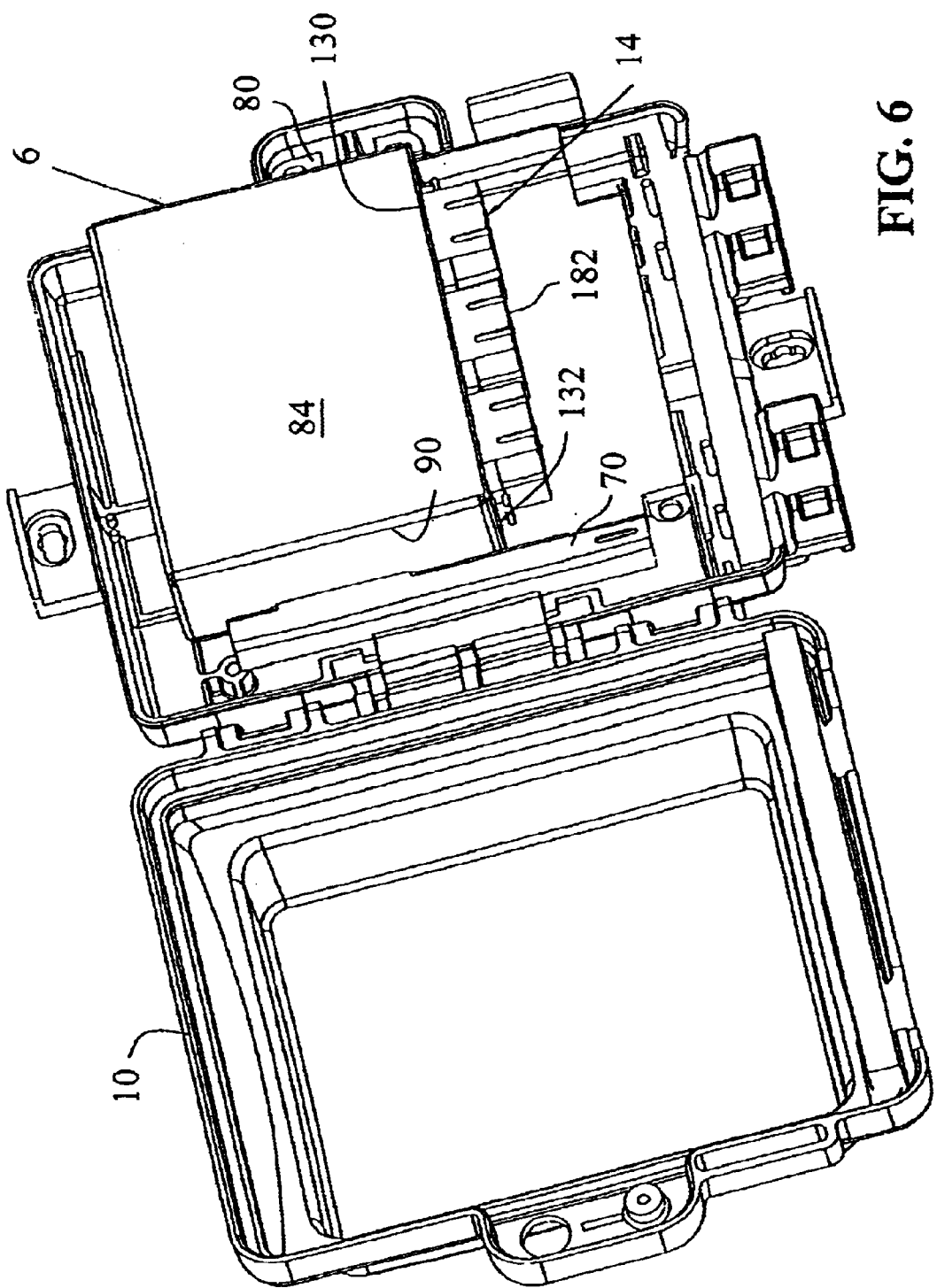
FIG. 6 is an isometric view showing a fiber optic interface wall in the closed position but with the lid of the housing enclosure still in the open position.

It should be understood that, as shown in FIG. 1, the connector interface 14 defines a telecom service connection side 180, whereas the user/service side is defined at 182, as shown in FIG. 6. It should be appreciated that the telecom side 180 should be locked off from the user such that, when in the position of FIG. 6, a special fastener can be positioned through the ear 80 and into threaded post 50 (FIG. 2) such that the user cannot access this side of the connection interface. Rather, the user can only open the housing portion 10 to access the user side 182 as shown in FIG. 6.

Advantageously, the device described above defines a system which is both very space-conscious as well as versatile. The system having the rotatable tray 102 allows the tray 102 to be latched in a fully locked position within the Network Interface Device 4 and movable between locked positions and unlocked positions. In the unlocked position, the tray can be rotated downward to a first detented position where the tray is horizontal where a technician can operate on the fiber splices or test the connections therein. As mentioned above, for initial assembly, the entire rotatable tray 102 is removable for assembly of the fiber cable therein. In this mode, the rotatable tray 102 can be rotated to a fully rotated position where the walls 64 and 102 are substantially co-planar. In this position, the tray can be positioned on a workbench for splicing purposes.

Furthermore, as the receptacles 14 are disposed in a substantially vertical orientation, this allows for easy disposition and coiling of the fiber cable as discussed with reference to FIG. 7. The vertical position also prevents dirt and other debris from collecting in receptacles 182 (FIG. 6) if a certain header is not occupied by a mating plug connector. The two sponge seals 58, 60 further prevent dirt and debris from collecting in the header 14.

It should be appreciated that the preferred embodiment of the enclosure 4 is plastic. The divider wall 6 could be designed as a stamped and formal member of a sheet steel, or could also be made from a plastic material, with a living hinge.

What we claim is:

1. A fiber optic interconnection enclosure, comprising a housing enclosure, said housing enclosure having a main housing portion having a back wall and a cover portion, a fiber optic interconnection divider wall dividing the housing enclosure into a telecom interconnection area and a user interconnection area, said interconnection divider wall having a connection interface to provide the interface between the telecom interconnection area and the user interconnection area, the interconnection divider wall being comprised of a main divider wall extending substantially planar with said back wall, and an interface wall extending substantially transverse to said main divider wall, said connection interface being provided on said transverse interface wall, said user interface area being provided on a front side of said main divider wall and said telecom interconnection area being provided on a back side of said main divider wall.

2. The fiber optic interconnection enclosure of claim 1, wherein said interconnection divider wall is pivotal about a first hinge in said housing enclosure.

3. The fiber optic interconnection enclosure of claim 2, wherein said interconnection divider wall is pivotal between a closed position, where said divider wall lies adjacent to said back wall, to an open position where said interconnection divider wall is rotated away from said back wall, and said telecom interconnection area of said connection interface being accessible only when said interconnection divider wall is in said open position.

4. The fiber optic interconnection enclosure of claim 3, wherein said divider wall, and first and second housing portions, all rotate about the same pivot axis.

5. The fiber optic interconnection enclosure of claim 3, wherein said interface wall extends transversely of said pivot axis.

6. The fiber optic interconnection enclosure of claim 5, wherein said interface wall extends in a horizontal plane, and said connection interface comprises a fiber optic header, with connection ports on opposite sides of said interface wall.

7. The fiber optic interconnection enclosure of claim 6, wherein a mating axis for said header is along a vertical axis.

8. The fiber optic interconnection enclosure of claim 7, wherein said divider wall includes a rotatable work tray on a back side thereof, which pivots about a horizontal axis, whereby said divider wall can be rotated to its fully open position, and said work tray rotated downwardly to a position adjacent to horizontal.

9. The fiber optic interconnection enclosure of claim 8, wherein said work tray includes a fiber cable splice holder.

10. he fiber optic interconnection enclosure of claim 8, wherein said work tray includes a retaining area for holding coiled fiber cable.

11. A fiber optic interconnection enclosure, comprising a housing enclosure, a fiber optic interconnection divider wall dividing the housing enclosure into a telecom interconnection area and a user interconnection area, said divider wall including a rotatable work tray positioned in said telecom interconnection area, which pivots about a horizontal axis, said rotatable work tray being positioned on a back side of said divider wall and being profiled to pivot about a horizontal axis, said divider wall can be rotated to its fully open position, whereby said rotatable work tray can be rotated downwardly to a position adjacent to horizontal.

12. The fiber optic interconnection enclosure of claim 11, wherein said interconnection divider wall is pivotal about a first hinge in said housing enclosure.

13. The fiber optic interconnection enclosure of claim 12, wherein said housing enclosure is comprised of a first housing portion having a back wall, and a second housing portion hinged to said first housing portion and movable relative thereto about a second hinge.

14. The fiber optic interconnection enclosure of claim 13, wherein said interconnection divider wall is also hinged relative to said first and second housing portions, and rotatable relative thereto.

15. The fiber optic interconnection enclosure of claim 14, wherein said interconnection divider wall, and first and second housing portions, all rotate about the same pivot axis.

16. The fiber optic interconnection enclosure of claim 15, wherein said interconnection divider wall includes an interface wall extending transversely of said pivot axis.

17. The fiber optic interconnection enclosure of claim 11, wherein said interconnection divider wall has a connection interface to provide the interface between the telecom interconnection area and the user interconnection area.

18. The fiber optic interconnection enclosure of claim 17, wherein said interconnection divider wall extends in a horizontal plane, and said connection interface comprises a fiber optic header having header halves on opposite sides of said plane.

19. The fiber optic interconnection enclosure of claim 18, wherein the mating axis for said header is vertical.

20. The fiber optic interconnection enclosure of claim 11, wherein said work tray includes a fiber cable splice holder.

21. The fiber optic interconnection enclosure of claim 11, wherein said work tray includes a retaining area for holding coiled fiber cable.

22. A fiber optic interconnection enclosure, comprising a housing enclosure, a connection interface positioned within said housing enclosure, defining an interface between a telecom interconnection and a user interconnection, and a rotatable work tray which pivots about a horizontal axis, said rotatable work tray being positioned on a back side of said divider wall and being profiled to pivot about a horizontal axis, said divider wall can be rotated to its fully open position, whereby said rotatable work tray can be rotated downwardly to a position adjacent to horizontal.

23. The fiber optic interconnection enclosure of claim 22, further comprising a fiber optic interconnection divider wall dividing the housing enclosure into a telecom interconnection area and a user interconnection area.

24. The fiber optic interconnection enclosure of claim 22, wherein said interconnection divider wall has a connection interface to provide the interface between the telecom interconnection area and the system interconnection area.

25. The fiber optic interconnection enclosure of claim 24, wherein said divider wall includes an interface wall which extends in a horizontal plane, and said connection member comprises a fiber optic header having header halves mounted to said interface wall, with connector ports on opposite side of said interface wall.

26. The fiber optic interconnection enclosure of claim 22, wherein said work tray includes a fiber cable splice holder.

27. The fiber optic interconnection enclosure of claim 22, wherein said work tray includes a retaining area for holding coiled fiber cable.

28. A fiber optic interconnection enclosure assembly, comprising:

a housing enclosure, comprising a main housing portion and a cover portion, said main housing portion and said cover portion cooperatively providing cable entry areas along one side thereof;

a fiber optic interconnection divider wall having an interface wall communicating with opposite sides of said interface divider wall and dividing the housing enclosure into a telecom interconnection area and a user interconnection area;

said divider wall providing a cable entry area communicating with said telecom interconnection area, for receiving an incoming fiber cable through said cable entry area and positioning an end thereof within said telecom interconnection area;

a cable retaining area attached to said divider wall and positioned within said telecom interconnection area for retaining an incoming cable, the incoming fiber cable being retained to said divider wall, said divider wall being profiled to rotate between open and closed positions with the incoming fiber cable fixed to the cable retaining area.

29. The fiber optic interconnection enclosure of claim 28, wherein said interconnection divider wall is pivotal about a first hinge in said housing enclosure, with the incoming fiber cable pivoting with the divider wall.

30. The fiber optic interconnection enclosure of claim 29, wherein said main housing portion has a back wall, and said cover portion is hinged to said main housing portion and is movable relative thereto about a second hinge.

31. The fiber optic interconnection enclosure of claim 30, wherein said interconnection divider wall is pivotal between a closed position, where said divider wall lies adjacent to said back wall, to an open position where said interconnection divider wall is rotated away from said back wall, and said telecom interconnection area of said connection interface being accessible only when said interconnection divider wall is in said open position.

32. The fiber optic interconnection enclosure of claim 31, wherein said divider wall, and first and second housing portions, all rotate about the same pivot axis.

33. The fiber optic interconnection enclosure of claim 31, wherein said interface wall extends transversely of said pivot axis, said interface wall.

34. The fiber optic interconnection enclosure of claim 37, further comprising a fiber optic header member mounted to said interface wall, with fiber optic connector ports on opposite sides of said interface wall, with user fiber optic connector ports positioned within said user interconnection area and with telecom fiber optic connector ports positioned within said telecom interconnection area.

35. The fiber optic interconnection enclosure of claim 34, wherein said interface wall extends in a horizontal plane with a mating axis for said fiber optic header is vertical.

36. The fiber optic interconnection enclosure of claim 35, wherein said divider wall includes a rotatable work tray on the back side thereof, which pivots about a horizontal axis, whereby said divider wall can be rotated to its fully open position, and said work tray rotated downwardly to a position adjacent to horizontal.

37. The fiber optic interconnection enclosure of claim 36, wherein said cable retaining area is positioned within said work tray.

38. The fiber optic interconnection enclosure of claim 37, wherein said cable retaining area is profiled for holding coiled fiber cable.

* * * * *